United States Patent
Mola et al.

(10) Patent No.: US 7,931,209 B2
(45) Date of Patent: Apr. 26, 2011

(54) SYSTEM FOR CONTROLLING AN AIR-CONDITIONING SYSTEM WITHIN AN ENVIRONMENT, IN PARTICULAR THE PASSENGER COMPARTMENT OF A VEHICLE

(75) Inventors: Stefano Mola, Orbassano (IT); Carloandrea Malvicino, Orbassano (IT)

(73) Assignee: C.R.F. Societa Consortile per Azioni (IT)

( * ) Notice: Subject to any disclaimer, the term of this patent is extended or adjusted under 35 U.S.C. 154(b) by 775 days.

(21) Appl. No.: 11/481,195

(22) Filed: Jul. 5, 2006

(65) Prior Publication Data

US 2007/0025414 A1 Feb. 1, 2007

(30) Foreign Application Priority Data

Jul. 5, 2005 (EP) .................................... 05425479

(51) Int. Cl.
| | |
|---|---|
| F24F 3/14 | (2006.01) |
| B60H 1/32 | (2006.01) |
| B60H 3/00 | (2006.01) |
| B60H 1/00 | (2006.01) |
| G01M 1/38 | (2006.01) |
| G05B 13/00 | (2006.01) |
| G05B 15/00 | (2006.01) |
| G05D 23/00 | (2006.01) |

(52) U.S. Cl. ............ 236/44 C; 62/239; 62/244; 165/42; 165/202; 165/203; 700/276; 700/277; 700/278

(58) Field of Classification Search ................. 236/44 C; 62/239, 244; 165/42, 202, 203; 700/276, 700/277, 278
See application file for complete search history.

(56) References Cited

U.S. PATENT DOCUMENTS

| | | | | |
|---|---|---|---|---|
| 5,553,661 | A | * | 9/1996 | Beyerlein et al. ............. 165/203 |
| 6,112,807 | A | * | 9/2000 | Dage ............................ 165/202 |
| 6,202,934 | B1 | | 3/2001 | Kamiya et al. |
| 2005/0235668 | A1 | * | 10/2005 | Huang et al. .................... 62/211 |

FOREIGN PATENT DOCUMENTS

| | | |
|---|---|---|
| EP | 0 618 098 A | 10/1994 |
| FR | 2821659 | 9/2002 |
| JP | 62 077212 A | 4/1987 |

OTHER PUBLICATIONS

Mola et al., Advanced Microsystems for Automotive Applications 2004, 2004, Springer Berlin Heidelberg, 4th edition, abstract.*
European Search Report EP 05 42 5479 date of completion of the search Nov. 24, 2005.

* cited by examiner

*Primary Examiner* — Thomas E Denion
*Assistant Examiner* — Michael Carton
(74) *Attorney, Agent, or Firm* — Ostrolenk Faber LLP

(57) ABSTRACT

Described herein is a system for controlling an air-conditioning system within an environment, in particular the passenger compartment of a vehicle, said system comprising a plurality of sensors designed to detect quantities representing the thermal comfort of the occupants and an electronic control unit (ECU), which calculates, on the basis of said quantities, a temperature indicating the thermal comfort of the occupants of the environment, on the basis of which the actuator devices of the air-conditioning system are driven.

11 Claims, 3 Drawing Sheets

SYSTEM FOR CONTROLLING AN AIR-CONDITIONING SYSTEM WITHIN AN ENVIRONMENT, IN PARTICULAR THE PASSENGER COMPARTMENT OF A VEHICLE

CROSS REFERENCE TO RELATED APPLICATION

This application claims the benefit of the filing date of European Patent Application No. 05425479.2 filed 5 Jul. 2005, the disclosure of which is hereby incorporated by reference

BACKGROUND OF THE INVENTION

1. Field of the Invention

The present invention relates to a system for controlling an air-conditioning system within an environment, in particular the passenger compartment of a vehicle.

As is known, the sensation of thermal comfort perceived by the occupants of an air-conditioned environment does not depend only upon the temperature of the air introduced into the environment by the air-conditioning system, but upon all the factors that affect heat exchange between the occupants and the environment.

Various studies, conducted with the purpose of detecting the sensation of thermal comfort perceived by the occupants of a vehicle equipped with an air-conditioning system of a traditional type, have shown how the temperature value used by the air conditioner for regulating the temperature of the air introduced into the passenger compartment is frequently not correlated to the thermal sensation perceived by the passengers of the vehicle, and how automatic regulation of the air-conditioning system is frequently unable to create the conditions necessary for giving the occupants of the vehicle an optimal sensation of thermal comfort.

In particular, as regards vehicles with passenger compartments of large dimensions, for example buses, it has been shown experimentally how the sensation of thermal comfort perceived by the occupants of said vehicles may vary considerably from occupant to occupant according to their position inside the passenger compartment.

The main cause of these differences, as mentioned above, is to be sought mainly in the thermal exchanges that occur between the passengers and their environment.

In a bus, for example, in which the top part of the side walls is frequently formed by transparent surfaces made of glass, it is clear how, in the case where these are directly exposed to rays of sunlight, they will have a temperature considerably higher than that of the air of the passenger compartment and markedly condition the thermal sensation of the passengers.

To improve the sensation of thermal comfort perceived by the passengers of a vehicle equipped with an air-conditioning system, systems for controlling air-conditioning systems have been developed, which take into account also the thermal exchanges that occur between the passengers and their environment.

2. Description of Related Art

Described in the patent FR-2.821.659, for example, is a system for controlling an air-conditioning system, comprising a processing and control unit (ECU) provided for driving actuator devices for actuating the air-conditioning system according to pre-set modalities, as a function of signals supplied by sensors and by a device for setting the desired temperature. Said unit comprises processing means provided for estimating the instantaneous value of an equivalent temperature according to a pre-set function that depends only upon the temperature of the treated air, upon the mean radiant temperature detected in a portion of the air-conditioned environment, and upon the flow rate of the treated air introduced into said environment.

SUMMARY OF THE INVENTION

The aim of the present invention is to provide a system for controlling an air-conditioning system within an environment and, in particular for controlling an air-conditioning system for the passenger compartment of a bus, which will constitute an improvement over known systems.

According to the present invention, a system for controlling an air-conditioning system within an environment is provided as defined in claim 1.

BRIEF DESCRIPTION OF THE DRAWINGS

For a better understanding of the present invention, there now follows a description of a preferred embodiment, provided purely by way of non-limiting example, with reference to the attached plate of drawings, wherein.

DETAILED DESCRIPTION OF THE INVENTION

Figure 1:
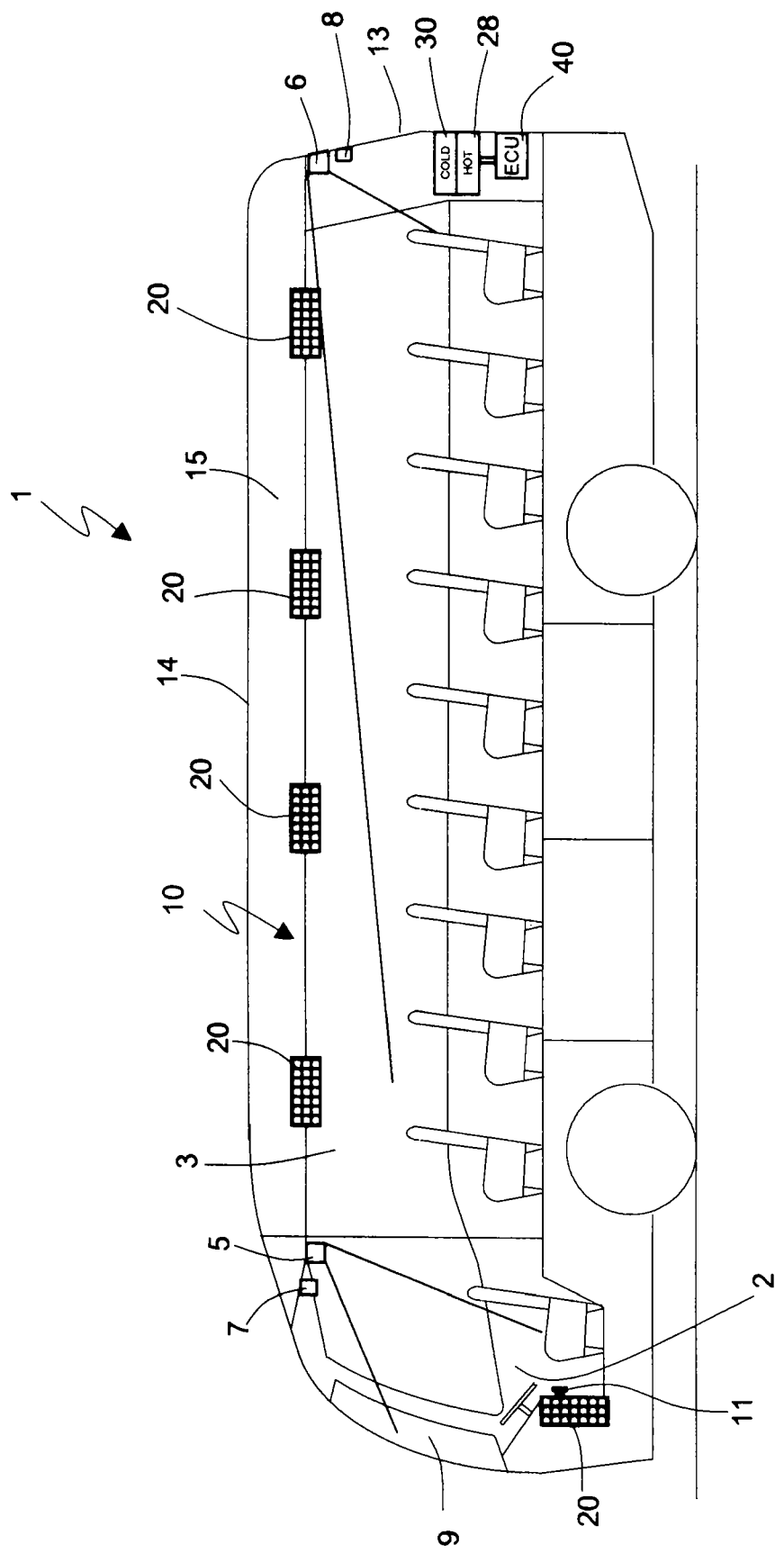
FIG. 1 is a schematic representation of a section of a passenger compartment of a vehicle, in particular a bus, equipped with a system for controlling an air-conditioning system according to the invention.

Designated as a whole by the reference number 1 in FIG. 1 is a bus (illustrated schematically), the passenger compartment of which is divided into a front driving area 2 and into a passenger compartment 3 communicating with one another.

The passenger compartment of the bus is delimited at the rear by a rear wall 13, at the top by a top wall 14, installed on which is a luggage compartment, which extends throughout the passenger compartment 3 and terminates in the driving area 2, and, at the front, by a windscreen 9.

The bus 1 is provided with an air-conditioning system 10 made up of a plurality of parts arranged along the bus and a system for controlling said air-conditioning system 10, whose elements will be described hereinafter.

In particular, and once again with reference to FIG. 1, the air-conditioning system 10 comprises a plurality of air-conditioning units 20 (in the case in point, five air-conditioning units 20), which are connected in parallel together by means of a supply (not shown in the figure) and are arranged, for example, in part along the luggage compartment of the passenger compartment 3 and in part in the bottom part of the driver area 2.

Figure 2:
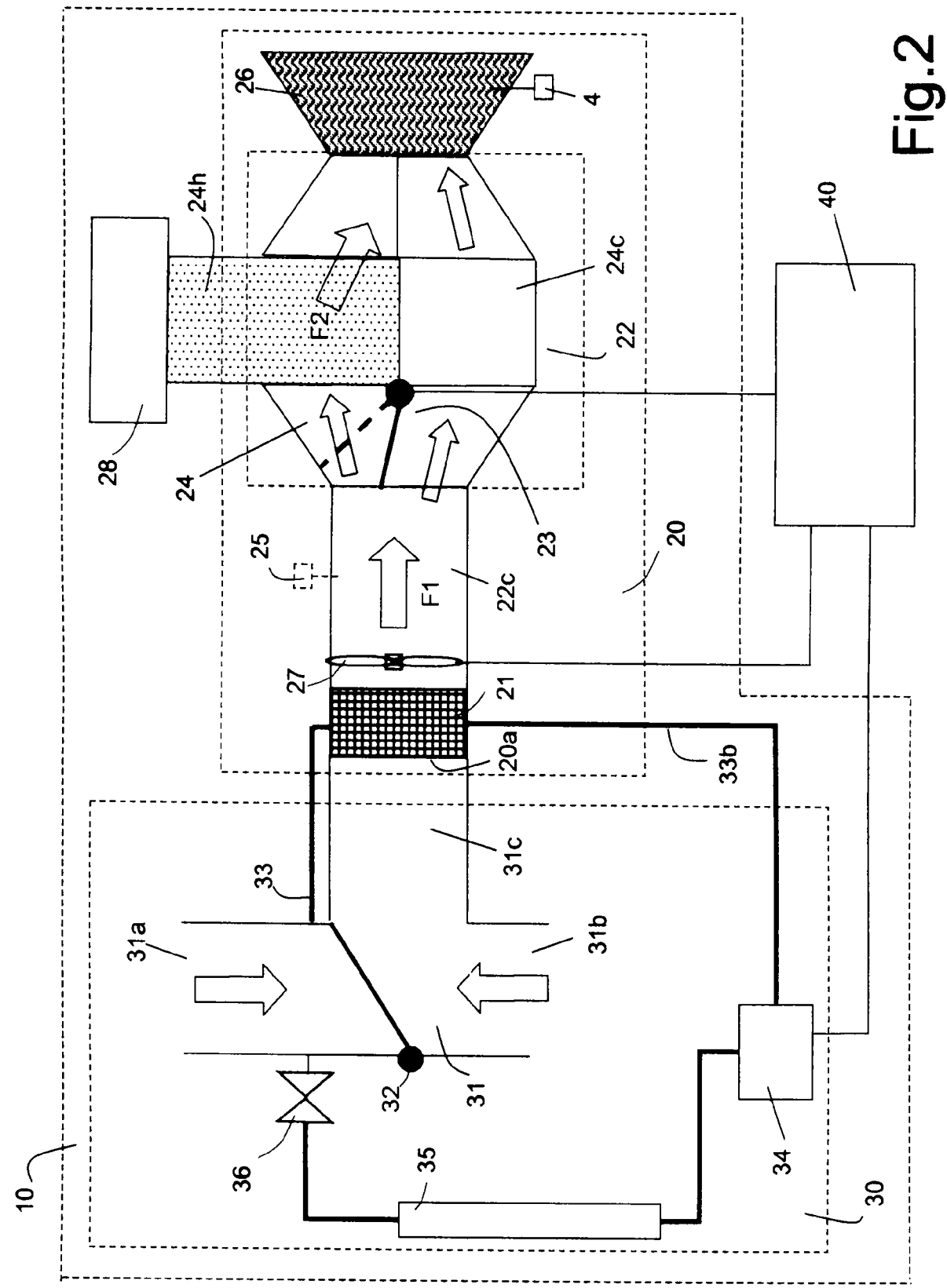
FIG. 2 shows a block diagram of an air-conditioning system controlled by a control system according to the invention.

As shown in FIG. 2, the air-conditioning system 10 comprises, in addition to the aforementioned air-conditioning units 20 (of which, for simplicity of description, only one is illustrated in FIG. 2), a closed-loop cooling circuit of a known type 30 and a heating circuit 28 of a known type, both circuits being connected to each air-conditioning unit 20.

The principle of operation of the air-conditioning system 10 shown in FIG. 2 is briefly described in what follows.

The cooling circuit 30 is provided with a supply duct 31 for conveying air to be treated having a first inlet 31a, communicating with the outside of the bus 1, and a second inlet 31b, communicating with the passenger compartment of the vehicle; the duct 31 has an outlet 31c communicating with an inlet 20a of the air-conditioning unit 20. A selector 32 is moreover arranged along the supply duct 31 for directing the flow present at its inlets 31a, 31b in the direction of the outlet 31c.

In this way, the air to be treated can be drawn in selectively from the environment outside the bus and/or from the passenger compartment of the bus according to the position assumed by the selector 32.

Each air-conditioning unit 20 comprises an evaporator 21 set in a position corresponding to the inlet 20a and designed to be traversed by the air coming from the supply duct 31.

The evaporator 21 is traversed by a coolant (for example, water and glycol), which flows along a duct 33 that connects all the elements that form part of the cooling circuit 30. In traversing the evaporator 21, the air yields heat to the coolant, is cooled, and is pushed into the mixer 22 by a fan 27.

The air-conditioning unit 20 further comprises a mixer 22, which communicates through a duct 22c with an outlet of the evaporator 21. Set inside the duct 22c is a fan 27 designed to supply a forced flow of air from the evaporator 21 to the mixer 22.

The coolant leaving the evaporator 21 is fed, through a duct 33b, to the inlet of a compressor 34, which is in turn connected at output with a condenser 35. Furthermore, a capillary duct 36 is set between the outlet of the condenser 35 and the inlet of the evaporator 21.

The mixer 22 defines an internal chamber 24, inside which two ways 24h and 24c are defined, which are separate from one another and can be selected at input by means of a selector 23, which supplies the air coming from the duct 22c to the ways 24h and 24c. In particular, the selector 23 can be set in a first limit position (indicated by the dashed line) in which all the incoming air is supplied to the duct 24c, in a second limit position (not represented), in which all the incoming air is supplied to the duct 24c, and in a plurality of intermediate positions, in which the incoming air is partialized between the two ducts 24h and 24c.

The duct 24h further communicates with an outlet of the air-heating circuit 28. The heating circuit 28, in a way in itself known, is conveniently made up of a heat exchanger of the liquid/air type, designed to receive a flow of liquid for cooling the internal-combustion engine (not illustrated) of the bus, through a control solenoid valve (not shown in the figure either).

The chamber 24 further communicates at output with the passenger compartment through a diffuser 26.

In the mixer 22 the cold air coming from the evaporator 21, before being introduced into the passenger compartment of the bus 1 by the diffusers 26, can be mixed with hot air coming from the heating circuit 28.

In particular, the flow of cold air F1 generated by the fan 27 can be appropriately mixed with the flow of hot air F2 coming from the heating circuit 28 by means of the selector 23.

The selector 23 can be positioned either in such a way as to channel the entire flow of cold air F1 towards the diffuser 26, without enabling any passage of cold air inside the hot-air duct 24 and thus prevent mixing of hot air with cold air, or in such a way as to enable completely, or only partially, passage of the flow of cold air F1 inside the hot-air duct 24, and thus favour mixing of the two flows of cold air F1 and hot air F2 according to the temperature required by the occupants of the bus 1.

As shown in FIG. 2, control of the air-conditioning system 10, and in particular control of the fan 27, of the compressor 34 and of the mixer 22, is obtained by means of an ECU 40 on the basis of values assumed by some parameters detected by means of sensors forming part of the control system 50 according to the invention.

Figure 3:
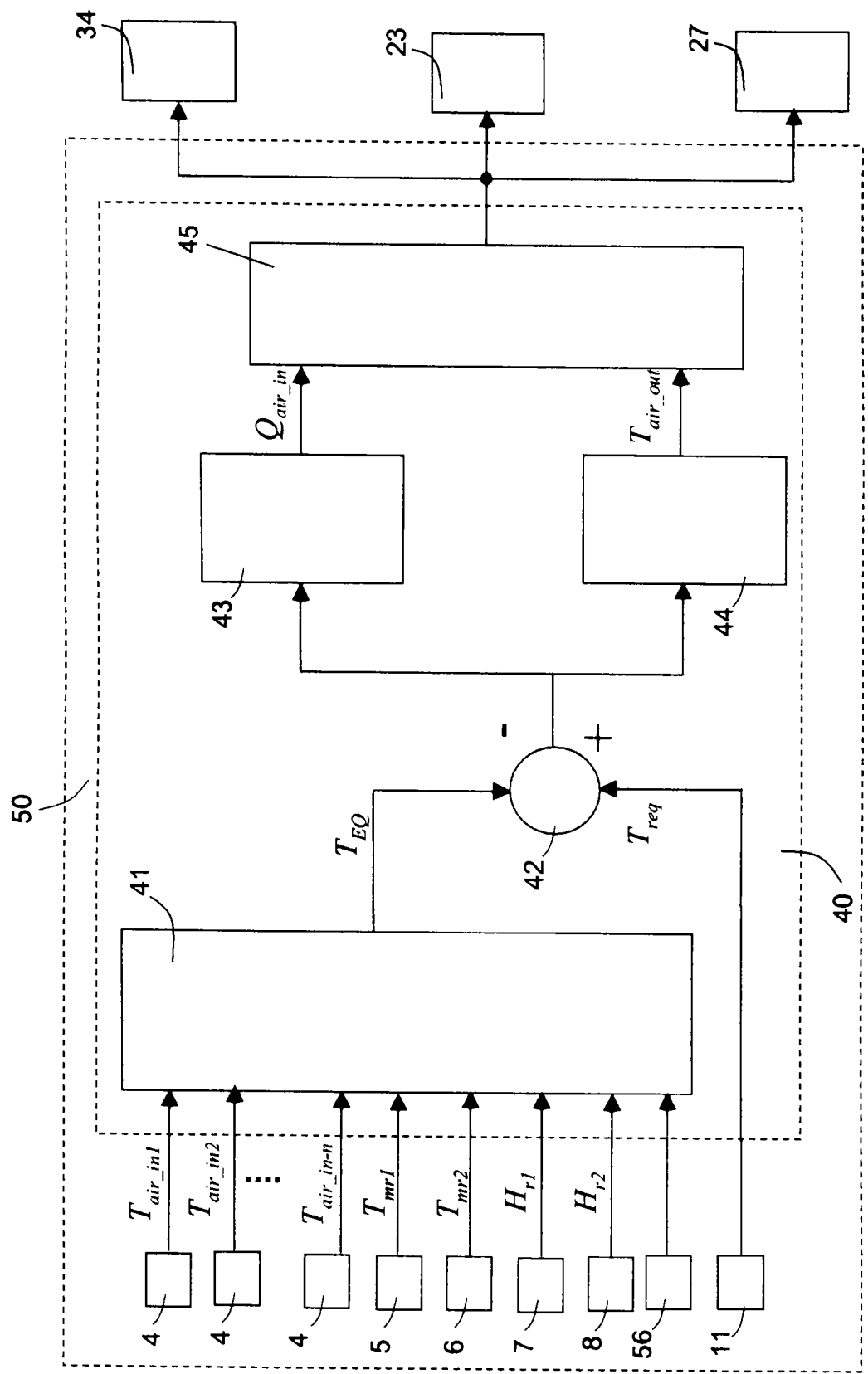
FIG. 3 shows a block diagram of a system for controlling an air-conditioning system according to the invention.

In particular, as shown in greater detail in FIG. 3, the system 50 for controlling the air-conditioning system 10 comprises, in addition to the aforementioned electronic control unit 40:

a temperature sensor 4, associated to each diffuser 26 and set therein, which supplies to the ECU 40 an electrical signal indicating the temperature $T_{air\_in}$ of the air introduced into the passenger compartment of the vehicle by each diffuser. Alternatively, in the absence of the temperature sensor 4, the temperature $T_{air\_in}$ can be calculated by the ECU 40 as a function of the temperature of the air leaving the evaporator 21 according to a pre-set relation; in this case, it will be necessary to have available a temperature sensor 25 directly at output from the evaporator 21;

a first sensor for detecting the mean radiant temperature 5, which supplies to the ECU 40 an electrical signal $T_{mr1}$ indicating the mean radiant temperature from the objects set within its field of vision, and can be located, as shown, for example, in FIG. 1, in the top wall 14 of the bus in the proximity of the driver's shoulders.

In particular, the mean-radiant-temperature sensor 5 is coupled to a positioning device (of a known type and not illustrated in the figure) designed to orient a sensitive portion of the sensor 5 in the direction of the windscreen 9 of the vehicle as shown in FIG. 1.

Said sensor is an infrared or thermopile sensor having a field of vision the extension of which is determined by the optics with which the sensor is equipped and comprises a thermocouple, which is housed in a vacuum chamber and is able to supply information on the mean radiant temperature. Consequently, by acting on the optics of the mean-radiant-temperature sensor, it is possible to regulate the field of vision of the sensor itself to adapt it to the specific conformation of the passenger compartment in which the sensor is installed; the signal supplied by the mean-radiant-temperature sensor 5 represents the average comfort perceived by the bus driver;

a second mean-radiant-temperature sensor 6, which supplies to the ECU 40 an electrical signal $T_{mr2}$ indicating the mean radiant temperature of the objects set within its own field of vision, and is located, as is shown, for example, in FIG. 1, in the internal top part of the rear wall 13 of the bus 1. Also the aforesaid second mean-radiant-temperature sensor 6 is coupled to a positioning device (of a known type and not illustrated in the figure) designed to orient a sensitive portion of the sensor 6 in the direction of the front area 2 to monitor the passenger compartment 3. The signal supplied by the mean-radiant-temperature sensor 6 represents the average comfort perceived by the passengers of the bus;

a first humidity sensor 7, which supplies to the ECU 40 an electrical signal $H_{r1}$ indicating the level of humidity of the air contained in the passenger compartment of the bus 1, and is located, for example, in the top wall 14 of the bus in the proximity of the driver's shoulders, as shown in FIG. 1;

a second humidity sensor 8, which supplies to the ECU 40 an electrical signal $H_{r2}$ indicating the level of humidity of the air contained in the passenger compartment of the bus 1, and is located, for example, on the inner side of the rear wall 13 of the bus 1, as shown in FIG. 1; and a setting device 11, of a type in itself known, which can be actuated manually by the occupants of the bus 1 for setting the temperature $T_{req}$ desired by the occupants of the bus 1.

Once again with reference to FIG. 3, the ECU 40 comprises a processing unit 41, designed to calculate an instantaneous value of an equivalent temperature $T_{EQ}$ indicating the thermal comfort perceived by the occupants of the bus irrespective of the positions occupied by them inside the bus 1. The ECU 40 calculates the instantaneous value of the equivalent temperature $T_{EQ}$ as a function of the mean radiant temperatures $T_{mr1}$, $T_{mr2}$ detected by the sensors 5 and 6, of the temperature $T_{air\_in}$ of the air leaving each diffuser 26, of the values of humidity of the air of the passenger compartment of the bus 1 $H_{r1}$, $H_{r2}$ detected by the sensors 7 and 8, and of coefficients determined in a preceding testing stage.

Conveniently, the ECU 40 is designed to estimate the equivalent temperature $T_{EQ}$ according to the formula:

$$T_{EQ} = \sigma(\alpha_i T_{mr_i} + \beta_j T_{air\_inj} + \gamma_k H_{rk})$$

where $\alpha_i, \beta_j, \gamma_k$ are coefficients determined experimentally in order to obtain an equivalent calculated temperature $T_{EQ}$ equal to an equivalent temperature measured experimentally.

In particular, the procedure for determination of the coefficients $\alpha$, $\beta$ and $\gamma$ consists in positioning some dummies provided with temperature sensors inside the passenger compartment of a bus (for instance, four dummies, one of which on the driver seat), subjecting them to the thermal transients by means of the air-conditioning system, and comparing the values of equivalent temperature detected by the sensors of the dummies with the values of temperature detected by the mean-radiant-temperature sensors and by the sensors for detecting the temperature of the air treated by the air-conditioning system introduced into the passenger compartment of the bus, and with the values detected by the humidity sensors.

In particular the values of the coefficients $\alpha$, $\beta$ and $\gamma$ are determined on the basis of a specific algorithm, which enables correlation of the values of equivalent temperature measured by the sensors of the dummies with the values of temperature and of humidity detected by the sensors.

In particular, once again with reference to FIG. 3, the coefficients $\alpha$, $\beta$ and $\gamma$ are stored in the ECU 40 (block 56) and used by the processing unit 41 for performing the calculation of the equivalent temperature $T_{EQ}$.

The estimated instantaneous value of the equivalent temperature $T_{EQ}$ and the value of the temperature desired by the occupants of the bus $T_{req}$ reach the inputs of a subtractor 42, at the output of which there is hence a signal indicating the difference or error $E = T_{req} - T_{EQ}$.

The ECU 40 further comprises two additional processing units 43 and 44, which calculate respectively the flow rate $Q_{air\_in}$ and the temperature $T_{air\_in}$ of the air to be introduced into the passenger compartment of the vehicle on the basis of the error calculated in the subtractor 42. The signals $Q_{air\_in}$ and $T_{air\_in}$ at output from blocks 43 and 44 are then sent at input to a control unit 45, which, on the basis of the signals $Q_{air\_in}$ and $T_{air\_in}$, drives the compressor 34, the fan 27, and the selector 23.

The action on the fan enables modification of the flow rate, whilst, acting on the compressor 34 and on the selector 23, it is possible to regulate the temperature of the air leaving the diffuser 26.

The control system 50 according to the present invention enables a considerable increase in the thermal comfort of the passengers of the bus in so far as, thanks to the combined action of the two mean-radiant-temperature sensors and the humidity sensors, it is able to detect any temperature variation that tends to modify the thermal sensation of the passengers and to regulate the temperature of the air introduced into the passenger compartment of the bus by the air-conditioning system in an optimal way.

Finally, it is clear that modifications and variations can be made to the control system described and illustrated herein, such as, for example, modification of the position and number of mean-radiant-temperature sensors and/or humidity sensors according to the type of environment that requires air conditioning, without thereby departing from the sphere of protection of the present invention, as defined in the annexed claims.

The invention claimed is:

1. A control system for controlling an air-conditioning system within an environment including independent zones of a driver compartment and independent zones within a passenger compartment of a vehicle, the control system comprising:
   a plurality of separate temperature sensors designed to independently detect temperatures prevailing at the driver compartment and at the independent zones of the passenger compartment, respectively;
   a plurality of comfort sensors, designed to detect quantities representing the thermal comfort of at least one passenger present in said environment;
   a temperature setting device operative for setting an objective temperature of said environment, which can be regulated by said passenger;
   an ECU receiving as input signals, signals provided from said comfort sensors, from said temperature sensors, and from said setting means for said compartments, respectively, and designed to generate control signals for actuator devices for actuating said air-conditioning system to provide air from independent air conditioning units to said compartments based on the respective comfort signals and temperature signals at each of said compartments, wherein said comfort sensors comprise:
      at least two mean-radiant-temperature sensors, a first mean-radiant-temperature sensor, having a set operational field of vision range, being positioned in said driver compartment and being operable to supply a signal indicating a mean radiant temperature in a first respective field of vision, including at least a portion of said driver compartment, and a second mean-radiant-temperature sensor, having a set operational field of vision range, being positioned in said passenger compartment and being operable to supply a signal indicating a mean radiant temperature in a second respective field of vision, including at least a portion of said passenger compartment.

2. The control system according to claim 1, in which said sensors moreover comprise at least one humidity sensor operable to supply a signal indicating the level of humidity of the air of said environment.

3. The control system according to claim 2, in which said ECU comprises:
   a first processing unit, which receives as input at least signals generated by said mean-radiant-temperature sensors and by said humidity sensor and are designed to calculate the instantaneous value of an equivalent temperature according to a pre-set function and on the basis of said input signals;
   a second processing unit operable for calculating the difference between said objective temperature and said equivalent temperature; and at least one third processing unit, which receives as input said difference and is operable to generate at output signals correlated to said control signals for said actuators.

4. The control system according to claim 3, in which said third processing unit is operable to calculate an instantaneous value of the flow rate of the air to be introduced into said passenger compartment as a function of said difference.

5. The control system according to claim 3, in which said third processing unit is operable to calculate an instantaneous value of the temperature of the air to be introduced into said passenger compartment as a function of said difference.

6. The control system according to claim 3, in which said first processing unit is operable to calculate the instantaneous value of said equivalent temperature ($T_{EQ}$) according to the formula:

$$T_{EQ} = \Sigma(\alpha_i T_{mr_i} + \beta_j T_{air\_inj} + \gamma_k H_{r_k})$$

where:
- $\alpha$, $\beta$ and $\gamma$ are coefficients that are pre-determined experimentally;
- $T_{mr}$ is the mean radiant temperature;
- $T_{air\_in}$ is the temperature of the air introduced into said environment by said air-conditioning system;
- $H_r$ is the humidity of the air; and the subscripts i, j and k indicate, respectively, a number of mean-radiant-temperature sensors, a number of air diffusers of said air-conditioning system, and a number of humidity sensors of said control system.

7. The control system according claim 1, wherein the passenger compartment and the driving compartment communicate with one another.

8. The control system according to claim 7, in which said mean-radiant-temperature sensors are coupled to a positioning device operable to orient a sensitive portion of each sensor in a direction of a windscreen of said driving compartment.

9. The control system according to claim 7, in which at least one of said mean-radiant-temperature sensors is arranged in a rear portion of said passenger compartment and is coupled to a positioning device operable to orient a sensitive portion of the at least one sensor in a direction of a front portion of the passenger compartment.

10. A vehicle comprising an air-conditioning system and a control system for controlling said air-conditioning system, wherein said air-conditioning system is built according to claim 1.

11. The vehicle according to claim 10, in which said vehicle is a bus.

* * * * *